United States Patent

Amano

[11] 4,403,831
[45] Sep. 13, 1983

[54] DISPLAY APPARATUS
[75] Inventor: Yoshifumi Amano, Zushi, Japan
[73] Assignee: Sony Corporation, Tokyo, Japan
[21] Appl. No.: 301,114
[22] Filed: Sep. 10, 1981
[30] Foreign Application Priority Data
Sep. 19, 1980 [JP] Japan ................... 55-131039
[51] Int. Cl.³ ................................. G02F 1/13
[52] U.S. Cl. ........................... 350/334; 350/344; 350/357; 340/787
[58] Field of Search .......... 350/334, 344, 357; 315/169.3; 340/787, 788

[56] References Cited

U.S. PATENT DOCUMENTS

| | | | |
|---|---|---|---|
| 3,877,790 | 4/1975 | Robinson | 350/344 |
| 4,130,408 | 12/1978 | Crossland et al. | 350/344 X |
| 4,148,128 | 4/1979 | Feldman | 350/344 X |
| 4,150,878 | 4/1979 | Barzilai et al. | 350/344 |
| 4,346,963 | 8/1982 | Kobale et al. | 350/344 |

OTHER PUBLICATIONS

Fowler, A. B., "Precurved Glass Plates for Gas Discharge Display Panels," *IBM Technical Disclosure Bulletin*, vol. 19, No. 4, (Sep. 1976) p. 1476.

Primary Examiner—John K. Corbin
Assistant Examiner—Richard F. Gallivan
Attorney, Agent, or Firm—Hill, Van Santen, Steadman & Simpson

[57] ABSTRACT

A display apparatus includes a first panel having an electrode provided on one surface thereof, a second panel having an electrode provided on the surface thereof facing to the electrode of the first panel, display material intervened between the electrodes of the first and second panels and a spacer disposed between the first and second panels, the peripheral portions of the first and second panels being sealed by sealing material. In this case, one of the first and second panels comprises a substrate and an elastic plate which is sealed to the substrate with its periphery, and fluid is sealed into a space defined by the substrate and elastic plate with such a pressure that the elastic plate contacts the spacer.

3 Claims, 3 Drawing Figures

DISPLAY APPARATUS

BACKGROUND OF THE INVENTION

1. Field of the Invention

The present invention relates generally to a display apparatus, and is directed more particularly to a display apparatus in which a first substrate and a second substrate, each having an electrode, are opposed through a spacer with a constant distance.

2. Description of the Prior Art

In the art, there are proposed display apparatus such as a liquid crystal (LC), electro-chromism (EC), electro-luminescence (EL), plasma (a kind of gas discharge) display apparatus and so on. These display apparatus have the construction generally shown in FIG. 1. In FIG. 1, 1 designates a first substrate (front panel) made of transparent material such as glass or the like, 2 a second substrate (back panel) made of glass, ceramics or the like which could not be transparent, 3 spacers serving to keep a constant distance between the first and second substrates 1 and 2, 4 a plurality of electrodes formed on the first substrate 1, and 5 a common opposing electrode formed on the second substrate 2, respectively. In this case, the spacers 3 are each made of, for example, ball-shaped glass beads or rod-shaped glass fibers. In the figure, 6 denotes light emitting or modulating material sealed in the space defined by the first and second substrates 1 and 2 which are sealed with each other by sealing material 7 made of resin or low melting point glass (frit glass).

With the above display apparatus, when a voltage is applied between a selected one of the electrodes 4 and the opposing electrode 5, light emission or modulation or coloring is generated selectively to present a desired display.

By the way, the performance (light emission start voltage rising-up and falling-down times and so on) of such the display apparatus depends mainly on the distance between the first and second substrates 1 and 2. For example, in the case of a gas discharge tube, the discharge initiate voltage is in proportion to the distance between the substrates, and in the case of a liquid crystal display apparatus (LCD), the distance between the substrates affects on the voltage response speed and so on with an error of about from several microns ($\mu$) to $10\mu$. Accordingly, the flatness of two substrates 1 and 2 are required to be high. To this end, the spacers 3 are used to maintain the distance between two substrates constant (uniform). If the pressure in the space sealed by the substrates 1, 2 is rather lower than the atmospheric pressure, since the substrates are pressed by the atmospheric pressure, the spacers 3 reveal their effect. However, in the cases of EL, ECD, LCD and so on, the pressure in the space defined by the substrates is substantially equal to the atmospheric pressure so that the spacers 3 perform no effect. In addition, as the substrate becomes large, the above phenomenon becomes remarkable. Therefore, it is rather difficult to make a display apparatus having a large panel.

In the art, in order to make the distance between the substrates of the display apparatus uniform, such a method is considered that the substrate itself is curved or the substrate is urged. The method, however, each utilizes the elasticity of the front or back glass panel, so that the above method has the following drawbacks:

(i) When the substrate is curved too much, it becomes difficult to positively and sufficiently seal the substrates with each other;
(ii) Pressure is concentrated at the central portion of the substrate;
(iii) The quality and thickness of glass making up the substrate is limited;
(iv) In case of frit-seal, distortion causes crack; and
(v) When the substrate is curved, fine electrode pattern can not be formed because the electrode is formed on the curved surface of the substrate.

Further, in order to make the flatness of the substrate high, it may be considered to increase the thickness of the substrate. This, however, results in the increase of its weight. Further, the calender thereof becomes expensive.

OBJECTS AND SUMMARY OF THE INVENTION

Accordingly, it is an object of the present invention is to provide a novel display apparatus free from the defects encountered in the prior art.

It is another object of this invention is to provide a display apparatus suitable as a large size display apparatus.

According to an aspect of the present invention, there is provided a display apparatus comprising:

(a) a first panel having an electrode provided on a surface thereof;
(b) a second panel having an electrode provided on a surface thereof;
(c) display material intervened between said electrodes of said first and second panels; and
(d) a spacer disposed between said first and second panels, peripheral portions of said first and second panels being sealed by sealing material, characterized in that one of said first and second panels comprises a substrate and an elastic plate which is sealed to said substrate with its periphery, and fluid is sealed into a space defined by said substrate and elastic plate with such a pressure that said elastic plate contacts said spacer.

The other objects, features and advantages of the present invention will become apparent from the following description taken in conjunction with the accompanying drawings through which the like references designate the same elements and parts.

DESCRIPTION OF THE PREFERRED EMBODIMENT

This invention will be hereinafter described with reference to the attached drawings.

Figure 2:
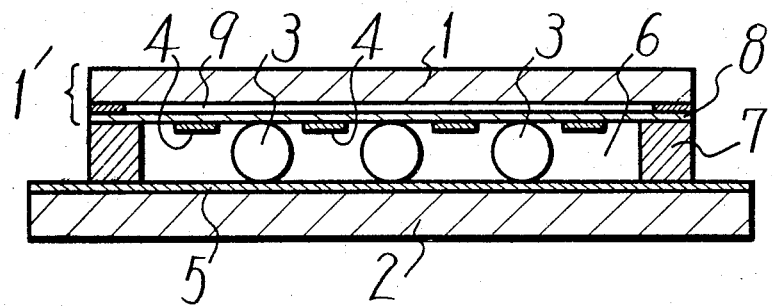
FIG. 2 is a cross-sectional view illustrating an example of the display apparatus according to the present invention.
Figure 3:
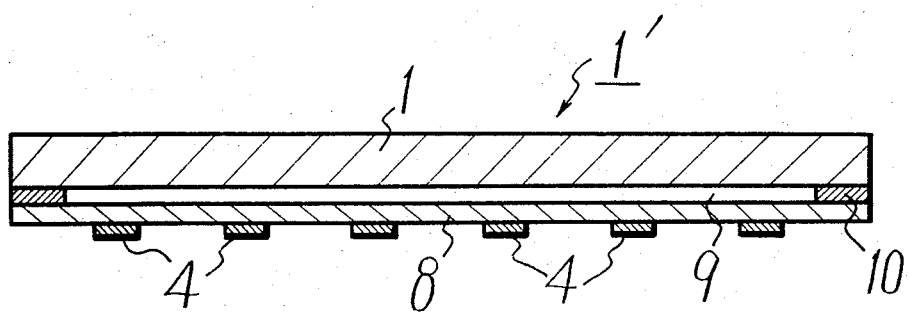
FIG. 3 is a cross-sectional view showing in an enlarged scale an example of the multi-layer panel used in the example of FIG. 2.

FIG. 2 illustrates in cross-section an embodiment of the display apparatus according to this invention and FIG. 3 depicts in an enlarged scale the cross-section of the multi-layer panel used in the embodiment of the invention shown in FIG. 2.

Figure 1:
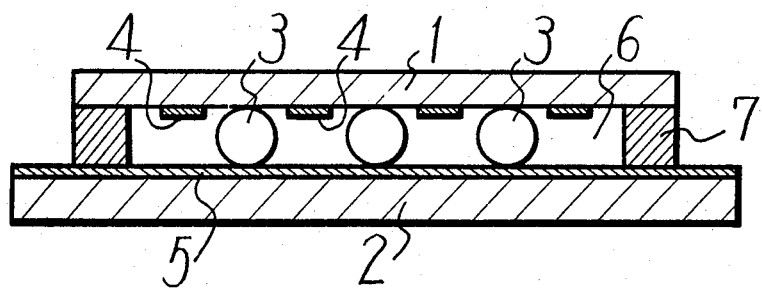
FIG. 1 is a cross-sectional view showing a prior art display tube to which the present invention may be applied.

In FIG. 2, 1' designates a multi-layer panel according to the invention, and the other elements of the display apparatus of the invention are entirely same as those shown in FIG. 1 so that the description on the latter will be omitted but the latter will be marked with the same reference numerals.

The multi-layer panel 1' is made to have the structure as shown in FIG. 3 in an enlarged scale. In FIG. 3, 8 denotes a transparent plate which is thinner than the first substrate 1 and made of material such as glass or plastic having a certain elasticity. This transparent plate 8 is sealed to the first substrate 1 on its peripheral portion by sealing material 10 such as frit glass or epoxy resin. Into the space defined by the plate 8 and the first substrate 1, which is sealed up through the sealing material 10, fluid 9 such as air or liquid is sealed up at such a pressure that the plate 8 can well contact with the spacers 3 (refer to FIG. 2), for example, such a pressure little higher than the atmospheric pressure. In this case, however, the time when the fluid 9 is sealed is selected suitably.

With the above arrangement, the plate 8 is always urged by the fluid 9 to be apart from the first substrate 1. Therefore, when the multi-layer panel 1' is assembled to the display apparatus as shown in FIG. 2, even if the pressure in the space defined by the first and second substrates 1 and 2 is substantially equal to the atmospheric pressure, the plate 8 can be positively urged against the spacers 3. Thus, the distance between two substrates 1 and 2 and accordingly between the electrodes 4 and 5 becomes positively uniform.

In the case where the pressure of the material 6 sealed in the space defined by the substrates 1 and 2 is selected higher than the atmospheric pressure, the pressure of fluid 9 sealed in the space defined by the plate 8 and the first substrate 1 is of course selected little higher than that of the material 6.

In the example of the invention shown in FIG. 2, the front panel is made of the multi-layer panel 1', but even if the back panel is made of the above multi-layer panel, the same effect can be performed. In the latter case, it is not always necessary that the plate 8 is transparent.

Further, in the case of the display apparatus such as LCD, ECD and so on in which there is no fear that it requires thermal process and produces gases, it is of no need that the plate 8 is made of glass, but the plate 8 may be made of acrylic resin sheet or the like.

Also, the fluid 9 to be sealed up could be gas (including air). However, if the fluid 9 is sealed with too high pressure, there may be such a fear that during the operation the display apparatus or seal is destroied by thermal expansion. In this respect, if liquid such as ethylene glycol is sealed as fluid 9, the heat is dispersed uniformly to perform cooling effect.

In addition to the above effect, with the present invention, while the substrate is remained unchange only the plate 8 having the little elasticity and the fluid 9 are additionally provided, so that even if the plate 8 is somewhat distorted by the pressure of fluid 9, the substrate itself is not curved or distorted. Therefore, the substrates can be sufficiently urged and sealed. In this case, since the fluid 9 functions as a spring, the pressure is applied to the substrate uniformly or it is prevented that the pressure is unreasonably applied to the peripheral frit surface thereof. Thus, glass with ordinary quality can be used as the substrate which is also sufficient to have an ordinary thickness, and the electrodes can also be formed similar to as in the prior art where the electrodes are formed on a plane.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

I claim as my invention:

1. A display apparatus comprising:
   (a) a first panel having an electrode provided on a surface thereof;
   (b) a second panel having an electrode provided on a surface thereof;
   (c) display material intervened between said electrodes of said first and second panels; and
   (d) a spacer disposed between said first and second panels, peripheral portions of said first and second panels being sealed by sealing material characterized in that one of said first and second panels comprises a substrate and an elastic plate which is sealed to said substrate with its periphery, and fluid is sealed into a space defined by said substrate and elastic plate with such a pressure that said elastic plate contacts said spacer.

2. A display apparatus as claimed in claim 1, wherein said fluid is air.

3. A display apparatus as claimed in claim 1, wherein said fluid contains ethylene glycol.

* * * * *